US008898075B2

(12) United States Patent
Khuchua-Edelman et al.

(10) Patent No.: US 8,898,075 B2
(45) Date of Patent: Nov. 25, 2014

(54) ELECTRONIC MENU SYSTEM AND METHOD

(75) Inventors: Vladimir Khuchua-Edelman, Carlsbad, CA (US); Christopher George, Tustin, CA (US); Trenten Allen Dethloff, Carlsbad, CA (US)

(73) Assignee: NTN Buzztime, Inc., Carlsbad, CA (US)

( * ) Notice: Subject to any disclaimer, the term of this patent is extended or adjusted under 35 U.S.C. 154(b) by 0 days.

(21) Appl. No.: 13/610,796

(22) Filed: Sep. 11, 2012

(65) Prior Publication Data
US 2014/0074580 A1 Mar. 13, 2014

(51) Int. Cl.
*G06Q 30/00* (2012.01)
*G06Q 50/00* (2012.01)

(52) U.S. Cl.
USPC .................. 705/15; 705/16; 705/77; 235/379

(58) Field of Classification Search
None
See application file for complete search history.

(56) References Cited

U.S. PATENT DOCUMENTS

| | | | |
|---|---|---|---|
| 6,317,734 B1* | 11/2001 | Zellweger | 715/853 |
| 7,522,992 B2* | 4/2009 | Obradovich et al. | 701/426 |
| 7,664,239 B2* | 2/2010 | Groff et al. | 379/93.17 |
| 7,882,150 B2* | 2/2011 | Badyal | 707/803 |
| 2002/0013734 A1* | 1/2002 | Bueno | 705/26 |
| 2002/0188524 A1* | 12/2002 | Shimizu | 705/26 |
| 2003/0050854 A1* | 3/2003 | Showghi et al. | 705/26 |
| 2007/0038727 A1* | 2/2007 | Bailey et al. | 709/219 |
| 2008/0270230 A1* | 10/2008 | Hendrickson et al. | 705/14 |
| 2009/0157613 A1* | 6/2009 | Strohmenger et al. | 707/3 |
| 2009/0164466 A1* | 6/2009 | Badyal | 707/7 |
| 2010/0042506 A1* | 2/2010 | Ravenel et al. | 705/21 |
| 2012/0030583 A1* | 2/2012 | DiPietro | 715/745 |
| 2012/0323707 A1* | 12/2012 | Urban | 705/15 |

* cited by examiner

*Primary Examiner* — Fateh Obaid
(74) *Attorney, Agent, or Firm* — Thibault Patent Group

(57) ABSTRACT

Methods and apparatus for providing configurable menus to customers are disclosed herein. In one embodiment, a computer server communicates with electronic ordering devices operated by customers, and the computer server receives purchasing information from one or more customers sent by respective ones of the electronic ordering devices. The computer server generates a first digitized menu for at least one of the customers based on the purchasing information, and sends the first digitized menu to the at least one electronic ordering device for display on the at least one electronic ordering device.

22 Claims, 9 Drawing Sheets

ELECTRONIC MENU SYSTEM AND METHOD

BACKGROUND

I. Field of Use

The present application relates to the hospitality industry. More specifically, the present application relates to systems and methods for providing configurable electronic menus to customers.

II. Description of the Related Art

Electronic menus, known as E-menus or I-menus, have been recently introduced to the hospitality industry to allow establishments such as bars, restaurants, nightclubs, hotels, and sports venues to offer their patrons an exciting, new way to place orders for food, drinks, and other products and services. A typical E-menu may comprise a personal electronic device, such as a tablet computer, capable of displaying various choices to customers and allowing them to place orders wirelessly through the device. E-menus allow establishments to change menu items and pricing quickly and easily, relieving them of the cost of printing new menus to meet changing demands by customers. However, this technology is in its infancy and, therefore, the full potential of E-menus has yet to be reached.

SUMMARY

The embodiments described herein relate to methods and apparatus for generating digitized choice sets (e.g., menus) to customers. In one embodiment, digitized menus are generated and provided to customers by a computer server in communication with electronic ordering devices operated by customers, the method comprising receiving, by the computer server, purchasing information from one or more customers sent by respective ones of the electronic ordering devices, generating a first digitized menu for display by at least one of the electronic ordering devices by the processor based on the purchasing information, and sending the first digitized menu to the at least one of the electronic ordering devices via a communication interface coupled to the processor.

In another embodiment, an apparatus is described for providing digitized menus to electronic ordering devices operated by customers, comprising a memory for storing processor-executable instructions and a plurality of accounts each for storing at least purchasing information of each of the customers, respectively, a communication interface for receiving the purchasing information from the customers sent by respective ones of the electronic ordering devices and for transmitting a first digitized menu to at least one of the customers, and a processor, coupled to the memory and the communication interface, for executing the processor-executable instructions in the memory that cause the apparatus to receive purchasing information from customers sent by respective ones of the electronic ordering devices, generate a first digitized menu for at least one of the customers based on the purchasing information, and send the first digitized menu to at least one of the electronic ordering devices for display on at least one of the electronic ordering devices.

In yet another embodiment, an apparatus is described for providing one or more digitized menus to customers for display, comprising a memory for storing processor-executable instructions, a communication interface for transmitting purchasing information from the apparatus to a computer server and for receiving account information related to one or more customers, a display for visually displaying a first digitized menu to one of the customers operating the apparatus, an input device for receiving input from the customer, and a processor, coupled to the memory, the display, the input device, and the communication interface, for executing the processor-executable instructions in the memory that cause the apparatus to, transmit the purchasing information to the computer server, generate the first digitized menu using the information related to previous purchases, the first digitized menu comprising an identification of goods or services offered for sale by a provider of the goods or services, the first digitized menu based on the purchasing information provided by the apparatus and/or other apparatuses in communication with the computer server, and provide the first digitized menu to the display for viewing by the customer.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to a variety of embodiments related to digitized menus, otherwise known as electronic menus, E-menus, I-menus, etc. In one aspect, a customer's past consumption is used to provide one or more customized, digitized choice sets, or menus, to the customer. In another aspect, customized choice sets are generated based on group dynamics, such as the quantity and selection of food and beverage items purchased by patrons in a restaurant setting. In yet another aspect, reward points are earned by customers as they purchase various items from one or more customized, digitized choice sets. The reward points earned by purchases from a first choice set may be redeemed for items found in a second choice set. One embodiment of a "choice set" comprises a typical food or beverage menu. Other choice sets include a menu of services offered by a spa, automobile mechanic, beautician, or other service provider. Still further choice sets include an identification of goods offered by merchants, for example, items offered for sale by a market, bar, nightclub, sporting venue, retail establishment, etc.

Figure 1:
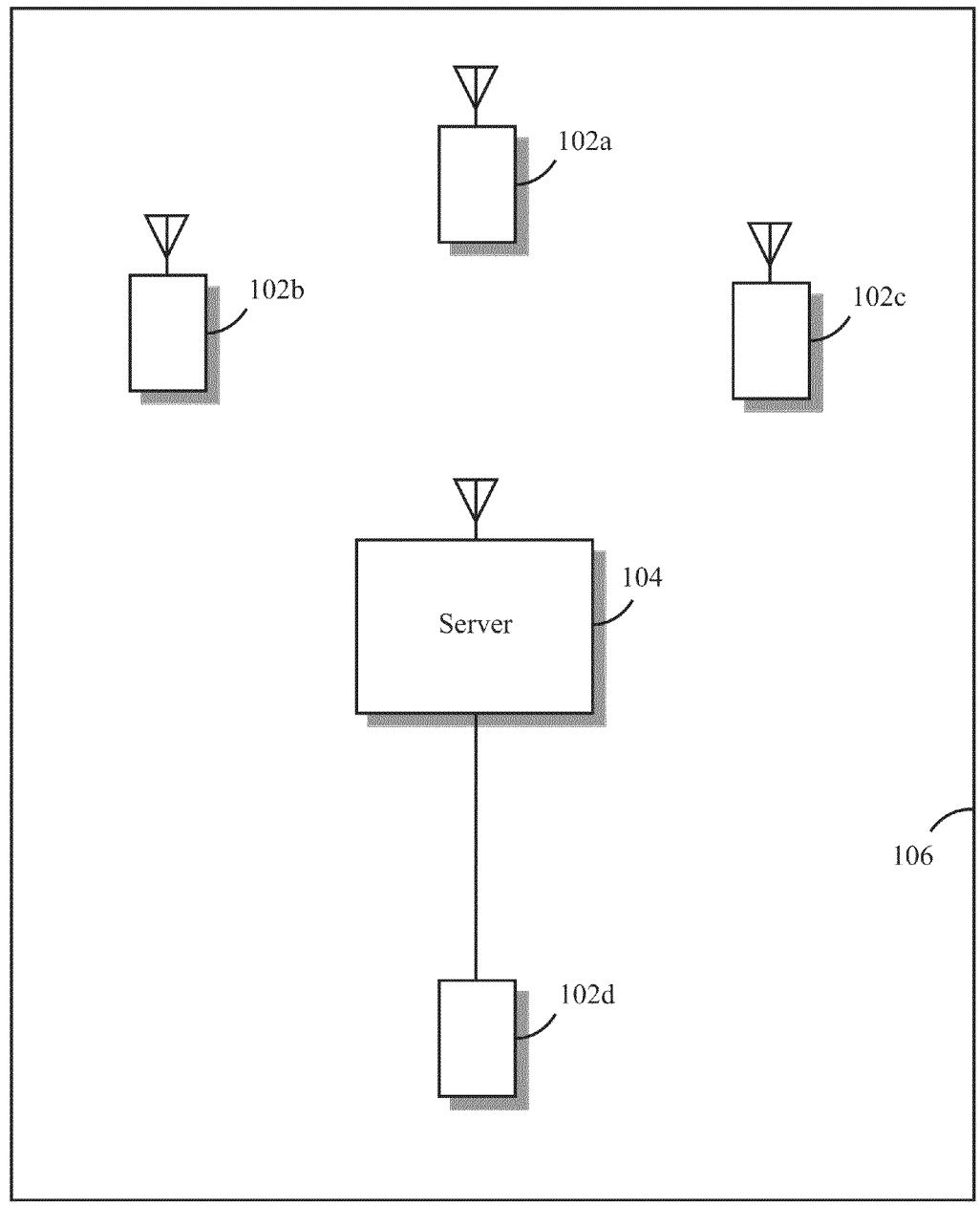
FIG. 1 illustrates one embodiment of a system for a goods or service provider to provide customized, digitized choice sets, or menus, to customers, each customer using an electronic ordering device to communicate with a server.

FIG. 1 illustrates system 100 for a goods or service provider 106 to provide customized, digitized choice sets to customers, each customer using an electronic ordering device 102a, 102b, 102c, or 102d to communicate with a server 104. Although only four electronic ordering devices 102 are shown in FIG. 1, in practical applications, many more electronic ordering devices are typically used.

In this embodiment, server 104 communicates with electronic ordering devices 102 within a relatively small geographic area, for example, on or within the premises of a goods or service provider, or within range of a wireless router used to enable communications between server 104 and electronic ordering devices 102. In other embodiments, server 104 communicates with electronic ordering devices 102 via a wide area network such as the Internet.

The system 100 may be used in a variety of locations, such as restaurants, bars, nightclubs, hotels, spas, sporting event venues, retail stores, grocery stores, and so on, to enable the creation and distribution of configurable menus to customers based on previous purchasing history of one or more customers. In a typical setting, electronic ordering devices are provided to customers as they visit a business premises so that the customers may each use one of the electronic ordering devices to view available items for sale and submit orders via their electronic ordering devices.

Electronic ordering devices 102a, 102b, and 102c typically comprises a portable electronic computing device capable of wireless communication with server 104. For example, electronic ordering device 102 may comprise one of a variety of Wi-Fi enabled tablet computers sold by a variety of computer manufacturers, such as the iPad tablet computer manufactured by Apple Computer of Cuppertino, Calif., or the Galaxy Tab tablet computer manufactured by Samsung Electronics of Seoul, Korea. Electronic ordering device 102d is capable of wired communication with server 104 but otherwise comprises the same functionality of electronic ordering devices 102a, 102b, and 102c. For example, electronic ordering device 102d may comprise a non-mobile computer with Ethernet capability incorporated into a seating area, such as a table, in a restaurant.

Any of the electronic ordering devices 102a, 102b, 102c, or 102d may additionally comprise circuitry to communicate via both wired and wireless communications. The electronic ordering devices 102 are typically loaded with software that restricts their functionality to certain applications related to, for example, a food/beverage menu/ordering system, game playing, music or video selection and/or listening/viewing, and/or some other form of entertainment. In other embodiments, electronic ordering device 102 may comprise a smartphone, such as an iPhone manufactured by Apple Computer loaded with one or more "apps" that allow customers to view configurable digitized menus, or choice sets, and place orders via these smartphones. Each electronic ordering device 102 typically comprises a display device for presenting configurable choice sets to customers, a user input device, such as a keypad, microphone, touchpad, or other known input device, to receive purchase orders from customers, and a communication interface that allows signals to be transmitted and received to/from electronic ordering devices 102.

In one embodiment, a provider of goods or services may provide electronic ordering device 102a, 102b, or 102c to customers as they arrive on the provider's premises. For example, a restaurant may provide an electronic ordering device 102 to each customer seated at tables located throughout the restaurant. Customers may bring their own electronic ordering device 102 in the form of a personal smartphone, tablet computer, laptop computer, etc., to view configurable choice sets and order goods and services therefrom. In this embodiment, an application for viewing and ordering goods and services may be loaded onto customers' personal computing devices as the customers arrive on the premises, or at a previous time prior to arrival on the premises. Alternatively, or in addition, customers may access a web site offered by the provider to view configurable menus and place orders.

Each electronic ordering device 102 may be configured to provide two or more choice sets, or menus, to customers, each choice set comprising a different category of goods and services. For example, a first choice set may comprise a menu of food or beverage items, while a second choice set may comprise a list of music or video available for listening/viewing by customers via for electronic ordering device 102 or an external device, such as a jukebox or sound system located on the premises where customers are located. A third choice set might include a selection of games, such as video games, games of chance, trivia games, etc. These games may be played by individual customers alone, or the games may be played against/with other customers co-located with customers or located remotely via the Internet.

Of course, each electronic ordering device 102 could comprise other functionality, such as the ability to access the Internet to "surf the web" or to access email, the ability to take digitized photographs and/or video, or other applications that normally operate on a smartphone, tablet, or other type of computer.

It should be understood that the term "menu", as used herein, is not limited to the common definition of a list of food or beverages available for ordering in a restaurant setting. Rather, it refers to a broader definition of displaying virtually any type of goods or services that are offered to customers by a provider of those goods or services, whether customers order on the premises of the providers or not. For example, in one embodiment, a menu may comprise a number if icons, displayed on an electronic ordering device, of available treatments available in a spa, such as deep tissue massage, Swedish massage, pedicures, manicures, etc. In another embodiment, a menu may comprise a list of automobile repair items, such as an oil change, tune up, fluid change, tire rotation, etc. offered by an automobile repair shop.

Further, it should be understood that the term "digitized menu" or "electronic menu" refers to an electronic embodiment of a menu or choice set that may be displayed by an electronic device having a display screen. Digitized menus may comprise a computer file saved in one or more formats, such as an image file, an html file, a word processor file, and many other popular file formats. In the embodiments discussed herein, they are generated by a processor residing at server 104 or within an electronic ordering device 102, and based on one and/or more past and/or present customer ordering behaviors, as will be described in greater detail later herein.

Referring back to FIG. 1, reference is made to an embodiment where system 100 is used by a restaurant to offer digitized choice sets to their customers. Although the following discussion refers to a specific use of system 100 in a restaurant setting, it should be understood that the concepts disclosed herein may be applied to other business settings such as bars, nightclubs, spas, sporting venues, automotive repair facilities, grocery stores, retail stores, or virtually any other business where customers may select goods and services from a configurable choice set or menu.

As customers arrive on the premises of a restaurant 106, each one may be provided with an electronic ordering device 102 by a restaurant employee. Each electronic ordering device 102 is configured to offer a digitized menu of food and beverage choices to each customer. Each customer may use his or her electronic ordering device 102 to log into an existing customer account managed by server 104 or to create a new customer account if one does not already exist. The customer account may have been created during a previous visit of restaurant 106, or a restaurant or other establishment affiliated with restaurant 106. Server 104 uses the customer account to determine the customer's past ordering behavior. For example, a customer account may indicate that a customer has ordered potato skins as an appetizer in each of his or her 6 visits to restaurant 106. Based on this information, server 104 may generate a digitized menu, for example, a menu that may be displayed electronically by electronic ordering device 102, prominently featuring potato skins, for transmission to the particular customer's electronic ordering device 102.

After a customer selects a certain item from a menu displayed by electronic ordering device 102, a message is generated and transmitted to server 104. Server 104 receives these orders from customers and forwards them to one or more restaurant employees, such as one or more cooks and/or waiters/waitresses. Further, server 104 may update the customer's account based on the order received from the customers. For example, if the customers ordered a particular item, such as a diet cola, server 104 may update the customer's account indicating that a diet cola had been ordered. Each time that a customer orders an item, server 104 updates the customer's account to reflect the order. In another embodiment, a customer's account is only updated after the customer has paid for the goods or services purchased. Additional information may be recorded in association with particular goods or service orders/purchases, for example a date and/or time that an item was ordered/purchased or an increase in rewards points related to the order/purchase, as explained later herein.

In one embodiment, server 104 evaluates information stored in a customer's account to generate a customized, digitized choice set for that customer based on the customer's previous purchases.

In another embodiment, server 104 evaluates information stored in a number of customer accounts to generate a digitized choice set for all customers, based on trends identified by the evaluation. For example, if french fries are consistently the most-ordered menu item during lunch time, server 104 may increase the price of french fries just prior to lunch time and provide an updated choice set comprising the higher prices to each electronic ordering device.

In another embodiment, server 104 may generate a digitized menu that comprises prominently displayed items that other customers have ordered. For example, if pot roast was the most-ordered entrée the previous evening at restaurant 106, server 104 may generate a digitized menu featuring pot roast and provide that menu to each electronic ordering device 102.

In another embodiment server 104 may generate a coupon or otherwise provide a discount for a menu item that complements a customer's purchase, such as generating a coupon for $1.00 off of a cup of coffee when the customer orders a slice of pie, or reducing the price of a glass of Chardonay if the customer orders white fish. The coupon or price reduction may be generated by server 104 or by electronic ordering device 102 as the customer's order is received. The coupon or price reduction may be displayed to the customer as an updated choice set, a "pop-up" visual display on the choice set previously provided to the customer's electronic display device, or in some other manner. In this way, the consumer is presented with the coupon or price reduction in time for the consumer to take advantage of the offer(s).

In yet another embodiment, server 104 may generate an identification of goods or services that other customers have ordered, and provide this information to electronic ordering device 102. For example, if server 104 receives an order for a rib eye steak, server 104 may determine, based on other customer's accounts, similar items that have been ordered by other customers, such as filet mignon or top sirloin steak. Server 104 may provide this information to electronic ordering device 102 for presentation to the customer immediately after the customer has entered his or her selection of a rib eye steak, so that the consumer may change his or her mind based on the alternatives provided by server 104.

In yet another embodiment, server 104 generates a digitized choice set that features items that are similar in nature and/or taste as items previously ordered by a customer. In this embodiment, once server 104 receives identification information and accesses the customer's account, it can generate a digitized menu comprising such foods or beverages similar in taste, appearance, or nature to foods or beverages that the customer has ordered in the past. In a related embodiment, server 104 may determine a gross margin, or profit, of such similar food or beverage items and generate a digitized menu that features items highest in gross margin or profit.

In another embodiment, server 104 may generate a digitized menu that prominently displays any item that has been purchased more than a predetermined number of times in the past, either by a particular customer or by a number of customers.

In yet another embodiment, server 104 may generate a configurable menu that comprises a portion displaying the customer's previous order and a way for the customer to purchase the same goods or services that were previously ordered.

In yet another embodiment, server 104 may generate a configurable menu in which a discounted price has been assigned by server 104 to at least some available menu items that have not been previously ordered by the customer, in an effort to expand the customer's usual purchasing habits.

In yet another embodiment, server 104 is able to generate multiple choice sets, each one belonging to a different category of goods or services. Thus, in addition to generating a digitized menu that prominently displays a customer's past food and beverage orders, server 104 may generate a digitized menu that lists, in order, a customer's most recently played songs via a jukebox in communication with the customer's electronic ordering device 102.

In yet another embodiment, server 104 generates a configurable menu featuring one or more items that are available at a discounted price, or an increased quantity, or both, for a limited time period and/or until a predetermined number of items have been ordered by customers. For example, in a coffee shop, server 104 may generate a configurable menu that offers customers an extra shot of espresso for only $1, good for the following 15 minutes, or until 10 customers have taken advantage of the offer by ordering an extra shot of espresso with their coffee beverage. Server 104 may update the configurable menu to provide an update of the number of times the offer has been accepted by customers and/or to update the time remaining to take advantage of the offer.

In other embodiments, choice sets are generated by server 104 based on operating conditions of a business. For example, if a restaurant has some inventory that is about to spoil, it may provide an indication of the amount and type of inventory to server 104. The information may be provided by an individual via a user interface to server 104, or it may be provided by an inventory control system. For example, the inventory control system may determine that 100 pounds of salmon was received on October $12^{th}$ and that only 80 pounds of salmon had been sold, and that the salmon will spoil if not consumed within 10 days of delivery. On October $20^{th}$, the inventory control system can determine, based on the current date, that 20 pounds of the salmon will spoil if not consumed within the following two days. This information may be provided to server 104 by the inventory management system and server 104 may offer a discounted price for the salmon until it is consumed.

In another example of generating menus based on business operating conditions, server 104 may arrange a selection of goods or services based on a gross margin, profit, or some other financial metric of each good or service. This information may be provided by an individual entering such information into server 104 via a user interface, or it may be provided automatically by an accounting system that may provide detailed information regarding the profitability of various items based on secondary conditions such as time of day, day of week, weekends, weekdays, holidays, major sporting events, demand, etc.

It should be understood that each of the embodiments described above may be combined with one or more other embodiments.

The term "prominently displaying", for the purposes of this disclosure, means "easily seen or noticed". Thus, prominently displaying an item on a digitized menu could comprise one or more of a number of display techniques, such as displaying an item at the top of a menu, displaying a title or description of the item in large, colorful font, bold, italicized, and/or underlined font, displaying a relatively large photograph of the item, displaying the item on a first "page" of an electronic menu, providing a flashing border around a digitized photograph of the item, or any other technique to make the item easily seen or noticed by a customer. In another embodiment, "prominently displaying" may comprise displaying an item in a certain portion of a choice set, such as a "Specials" section of the choice set.

As mentioned above, each choice set generated by server 104 may be categorized with respect to the type of goods and services found in a respective choice set. For example, a first category may comprise food/beverage and a second category may comprise entertainment. Each categorize may comprise sub-categories. For example, the category of "entertainment" may comprise sub-categories of "music", "videos", and "games", among others. The category of "food/beverage" may comprise sub-categories such as "pasta", "seafood" "deserts", "fast food", "low calorie food", "appetizers", "beer", "wine", etc. Other categories may comprise "grocery", "retail", "automotive services", "spa services", and almost an unlimited number of other category types. Generally, only one choice set is displayed to customers at a time on electronic ordering device 102, however electronic ordering device 102 may store a plurality of choice sets in memory.

System 100 may, in addition to offering digitized choice sets to customers, provide an integrated rewards program that allows customers to accumulate reward points for their purchases. For example, as server 104 receives orders from electronic ordering device 102 (or after a final bill has been paid), server 104 may credit an account associated with a customer using electronic ordering device 102 a predetermined number of reward points based on the cost of the item(s) purchased. For example, one reward point may be awarded for every dollar of items purchased. An indication of the number of reward points may be stored in the same account that is used to store customers' previous ordering habits.

Customers may redeem reward points by exchanging them for a reduction in price for subsequent purchases. This may be done seamlessly between categories. For example, customers may earn rewards points for purchasing a number of food items in a restaurant (food category), and then redeem them for game play credits ("game" category). Reward points earned for listening to music purchased using a "jukebox" application via electronic ordering device 102 ("music" category) may be redeemed for food purchases ("food" category).

Figure 2:
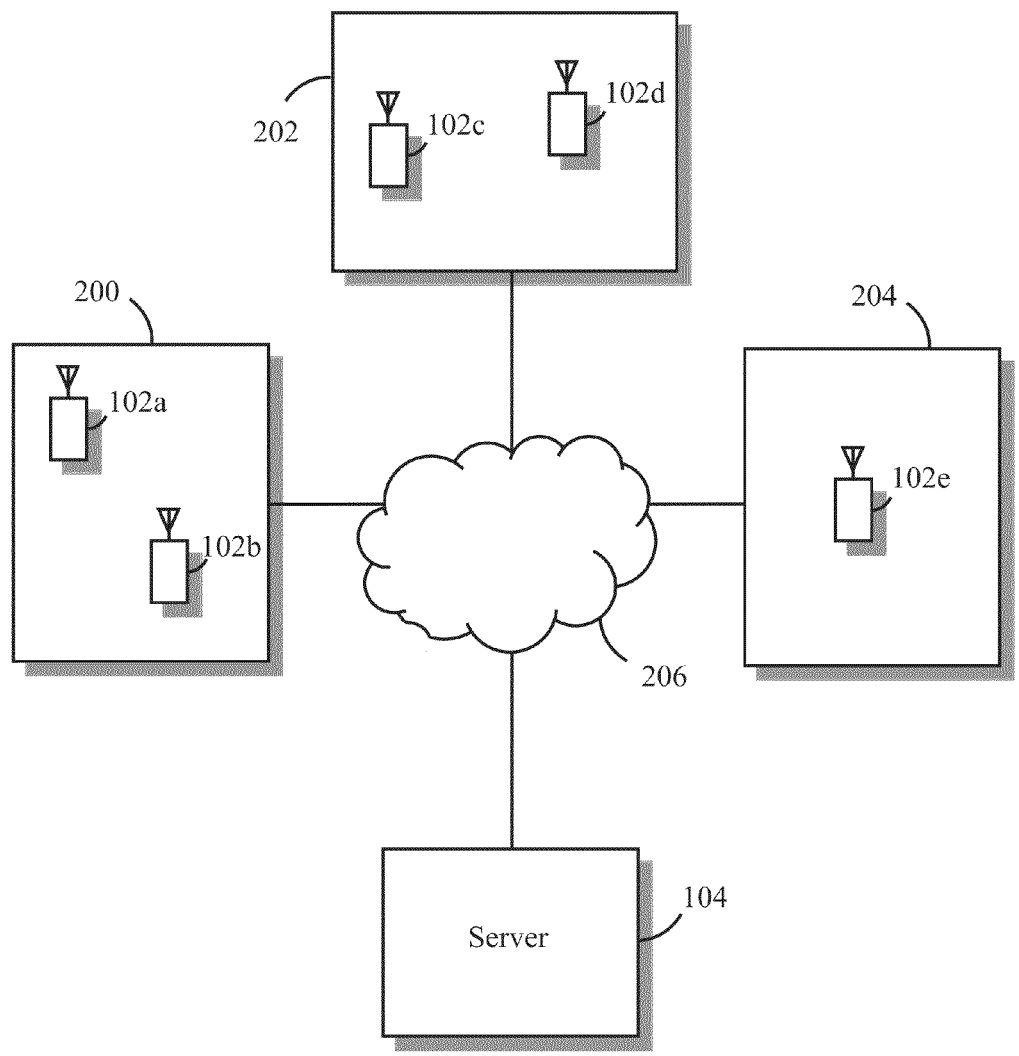
FIG. 2 illustrates another embodiment of a system for providing digitized menus to consumers, showing a server in communication a plurality of the electronic ordering devices shown in FIG. 1 located in multiple locations.

FIG. 2 illustrates another embodiment of system 100, showing server 104 in communication with electronic ordering devices 102a, 102b, 102c, 102d, and 102e, with electronic ordering devices 102a and 102b located at a first goods or service provider 200, electronic ordering devices 102c and 102 located at a second goods or service provider 202, and electronic ordering device 102e located at a third goods or service provider 204. Each of the electronic ordering devices communicates with server 104 using one or more well-known techniques, such as using Wi-Fi communications between electronic ordering devices and a router/modem combination located at each goods or service provider and connected to server 104 via wide area network 206, such as the Internet. In another embodiment, communications between electronic ordering devices use wireless data services provided by a wireless data provider to communicate directly with server 104.

Each of the goods or service providers 200, 202, and 204 may be affiliated with each other, offering the same or similar goods or services, or they may be independent of each other, offering a variety of goods or services from each other. Server 104 may provide digitized, configurable choice sets to each of the electronic ordering devices, as described in the embodiments above. Further, indications of customer purchases at any of the goods or service providers can be provided to server 104 for storage in each customer's account managed by server 104. Rewards points may be earned for any of the purchases, and points earned by purchases in one good or service provider may be used to purchase goods or services from a different goods or service provider.

Figure 3:
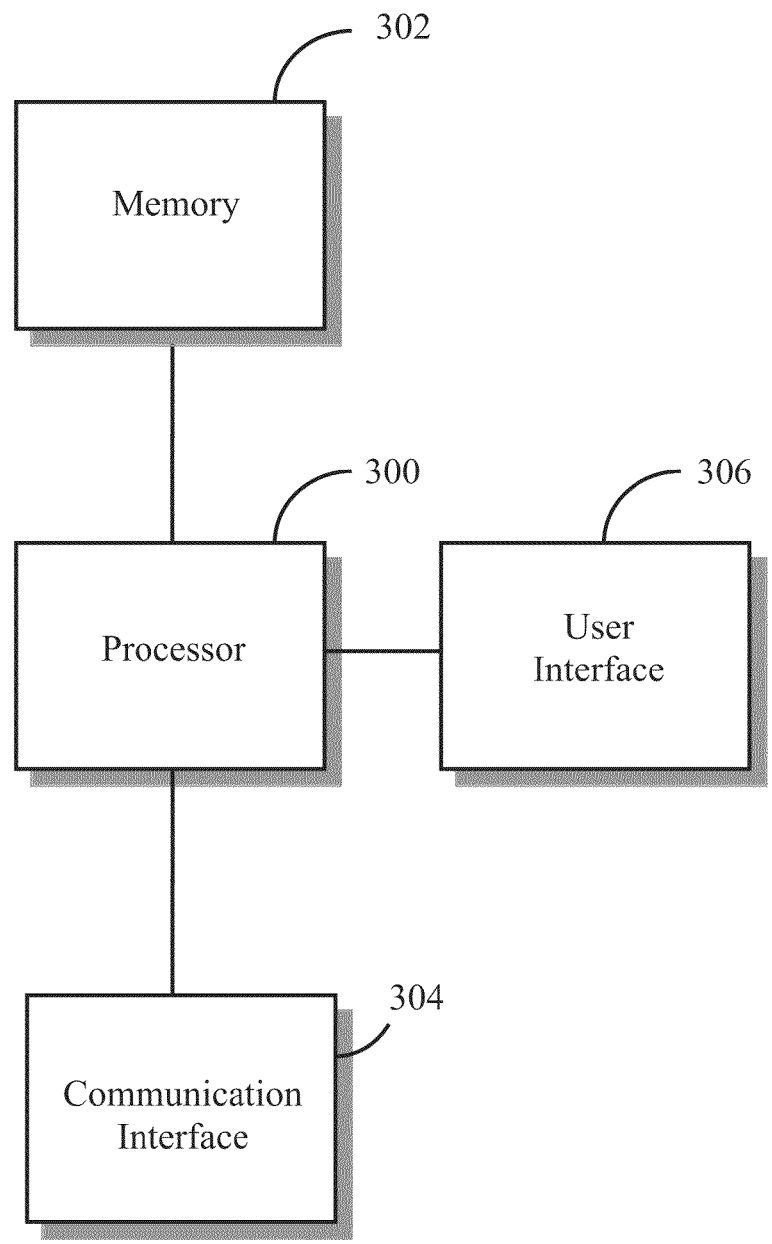
FIG. 3 is a functional block diagram of one embodiment of the server shown in FIG. 1 and FIG. 2.

FIG. 3 is a functional block diagram of one embodiment of server 104. Specifically, FIG. 3 shows processor 300, memory 302, communication interface 304, and user interface 306. It should be understood that not all of the functional blocks shown in FIG. 3 are required for operation of server 104 (for example, user interface may not be necessary), that the functional blocks may be connected to one another in a variety of ways, and that not all functional blocks necessary for operation of server 104 are shown (such as a power supply), for purposes of clarity.

Server 104 may comprise virtually any commercially-available servers on the market today, including the P4300IP server system manufactured by Intel Corporation of Santa Clara, Calif. Processor 300 provides general operation of server 104 by executing processor-executable instructions stored in memory 302, for example, executable code. Processor 300 typically comprises a general purpose processor, such as any of the Xenon® family of processors manufactured by Intel Corporation of Santa Clara, Calif., although any one of a variety of microprocessors, microcomputers, and/or microcontrollers may be used alternatively.

Memory 302 comprises one or more information storage devices, such as hard drives, RAM memories, ROM memories, flash memories, and/or virtually any other type of electronic, optical, or mechanical memory device. Typically, memory 302 comprises more than one type of memory. For example, memory 302 may comprise a ROM memory used to store processor-executable instructions for operation of server 104, plus RAM memory to store customer account information.

Communication interface 304 is electronically coupled to processor 300 and comprises electronic circuitry necessary for server 104 to communicate with electronic ordering devices and employees working in various establishments that provide goods and services to their patrons. Typically, communication interface comprises hardware, software and/or firmware necessary to transmit and receive information sent via one or more commonly-used network protocols, such as the well-known TCP/IP suite of protocols. Alternatively, or in addition, communication interface could comprise electronics and supporting software/firmware to support other well-known communication types, including Wi-Fi, Bluetooth, wireless telephone communications, fiber-optic communications, and so on.

User interface 306 is coupled to processor 300 and is used to allow an individual to control operation of server 104 and/or to receive information from server 104. User interface 306 may comprise one or more pushbuttons, switches, sensors, keypads, and/or microphones that generate electronic signals for use by processor 300 upon initiation by a user. User interface 306 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. Of course, the aforementioned items could be used alone or in combination with each other and other devices may be alternatively, or additionally, used.

Figure 4:
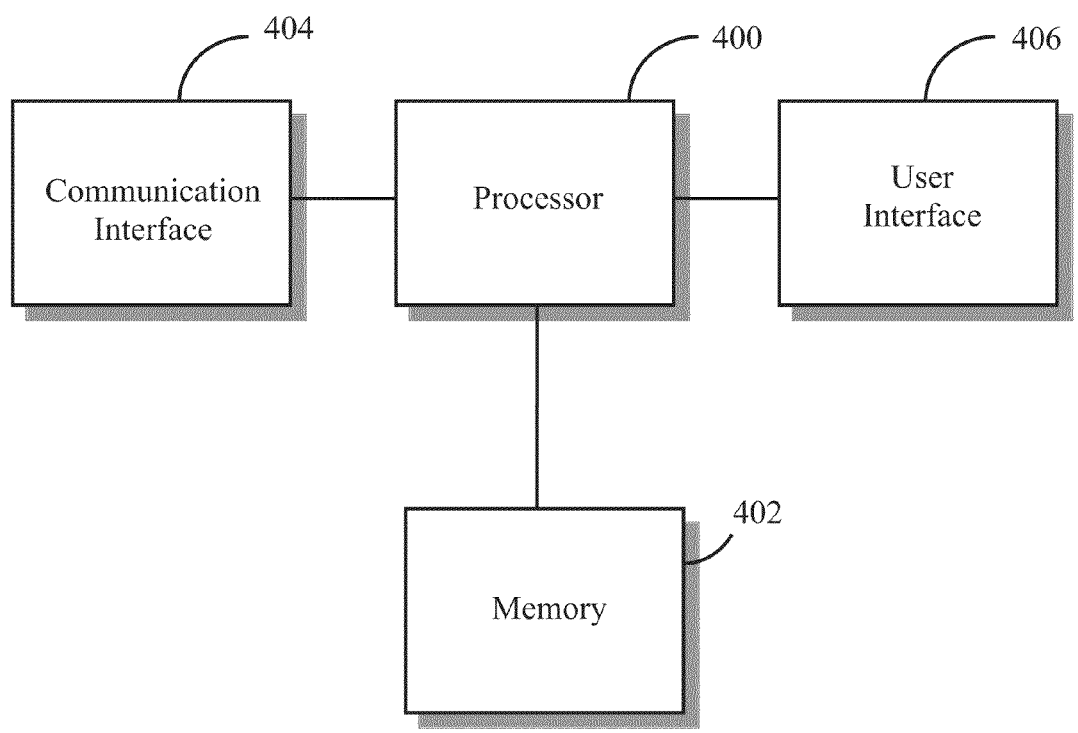
FIG. 4 is a functional block diagram of one embodiment of one of the electronic ordering devices of FIG. 1 and FIG. 2.

FIG. 4 is a functional block diagram of one embodiment of an electronic ordering device 102. Specifically, FIG. 4 shows processor 400, memory 402, communication interface 404, and user interface 406. It should be understood that the functional blocks may be connected to one another in a variety of ways and that not all functional blocks necessary for operation of electronic ordering device 102 are shown (such as a power supply), for purposes of clarity.

Electronic ordering device 102 may comprise virtually any commercially-available portable or fixed computer on the market today having communications capabilitites. In a typical embodiment, electronic ordering device 102 comprises a tablet computer, such as a Galaxy Tab 10.1 tablet computer manufactured by Samsung Electronics of Seoul, Korea. Processor 400 provides general operation of electronic ordering device 102 by executing processor-executable instructions stored in memory 402, for example, executable code. Processor 400 typically comprises a general purpose processor, such as Tegra 2 processor manufactured by Nvidia Corporation of Santa Clara, Calif., although any one of a variety of microprocessors, microcomputers, and/or microcontrollers may be used alternatively.

Memory 402 comprises one or more information storage devices, such as hard drives, RAM memories, ROM memories, flash memories, and/or virtually any other type of electronic, optical, or mechanical memory device. Typically, memory 402 comprises more than one type of memory. For example, memory 402 may comprise a ROM memory used to store processor-executable instructions for operation of electronic ordering device 102, plus RAM memory to store one or more digitized choice sets.

Communication interface 404 is electronically coupled to processor 400 and comprises electronic circuitry necessary for electronic ordering device 102 to communicate with server 104. Typically, communication interface comprises hardware, software and/or firmware necessary to transmit and receive information sent via one or more commonly-used network protocols, such as the well-known TCP/IP suite of protocols. Alternatively, or in addition, communication interface could comprise electronics and supporting software/firmware to support a variety of well-known communication types, including Ethernet, Wi-Fi, Bluetooth, fiber-optic communications, and so on.

User interface 406 is coupled to processor 400 and is used to allow customers to view one or more digitized choice sets received from server 104 via communication interface 404 and to place orders based on the choice sets. User interface 406 may comprise one or more touchscreens, pushbuttons, switches, sensors, keypads, and/or microphones that generate electronic signals for use by processor 400 upon initiation by customers. User interface 406 may additionally comprise one or more liquid crystal displays (LCDs), one or more light emitting diode displays (LEDDs), one or more light emitting diodes (LEDs), light arrays, or any other type of visual display. Further, user interface 406 could, alternatively or in addition, comprise an audio device, such as a speaker, for audible presentation of information to customers. Of course, the aforementioned items could be used alone or in combination with each other and other devices may be alternatively, or additionally, used. Typically, input device 406 comprises a widely-known touchscreen device capable of displaying information and receiving customer input.

Figure 5:
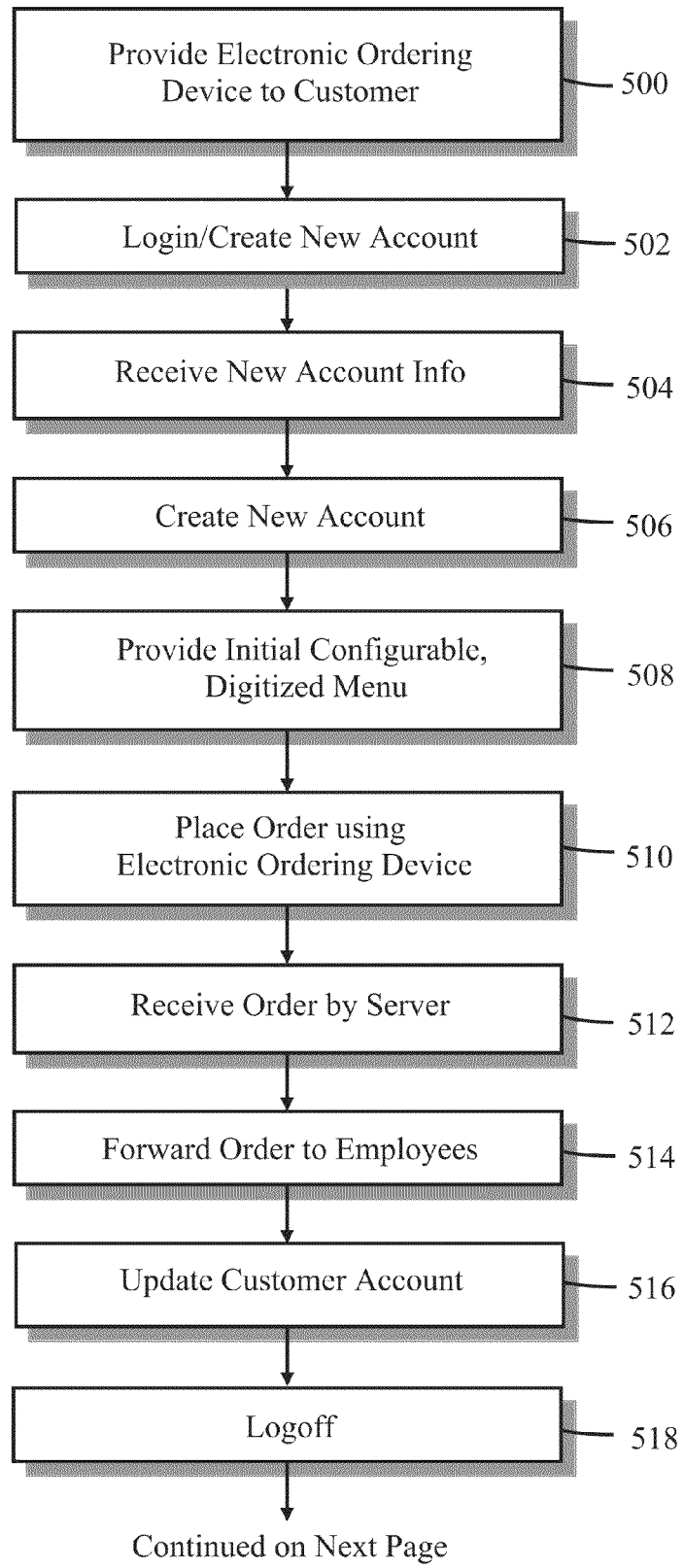
FIG. 5 is a flow diagram illustrating one embodiment for generating digitized menus.
Figure 5:
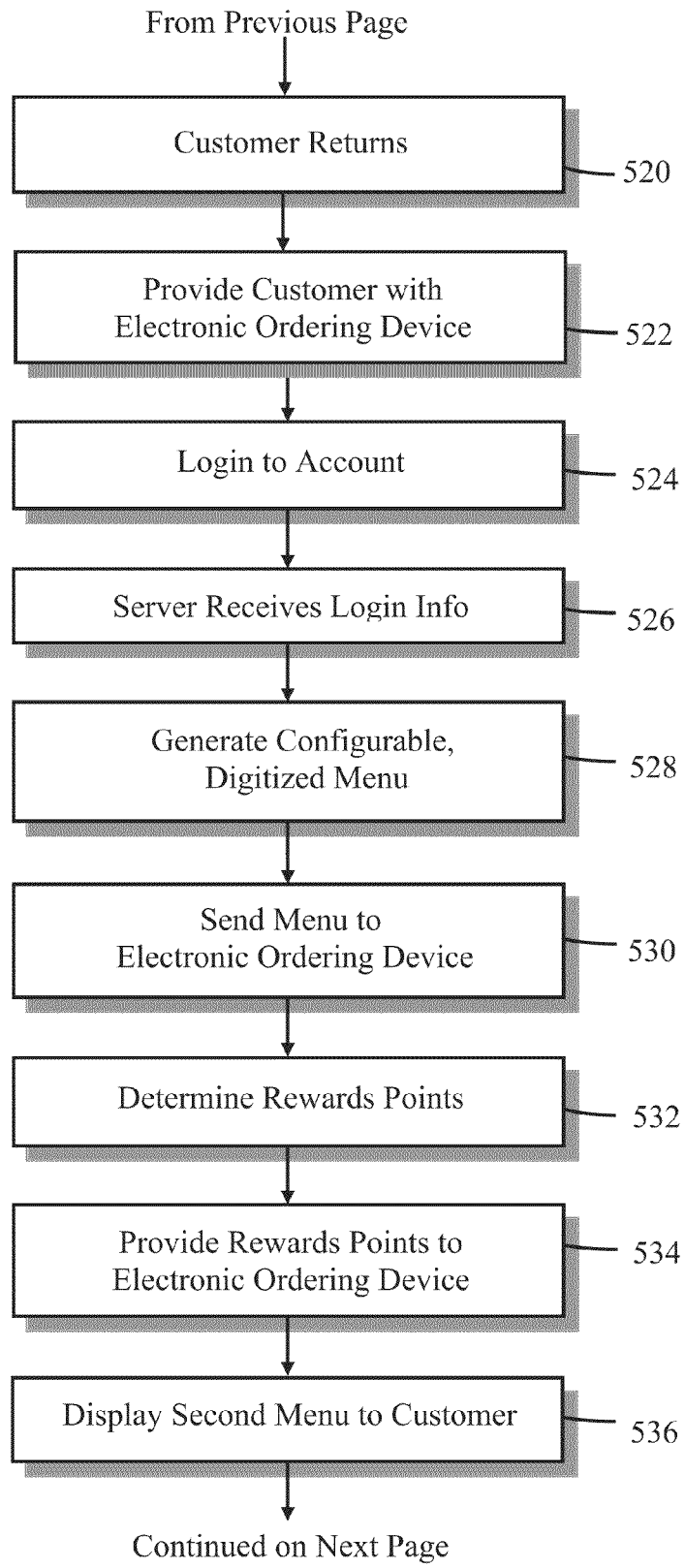
Figure 5:
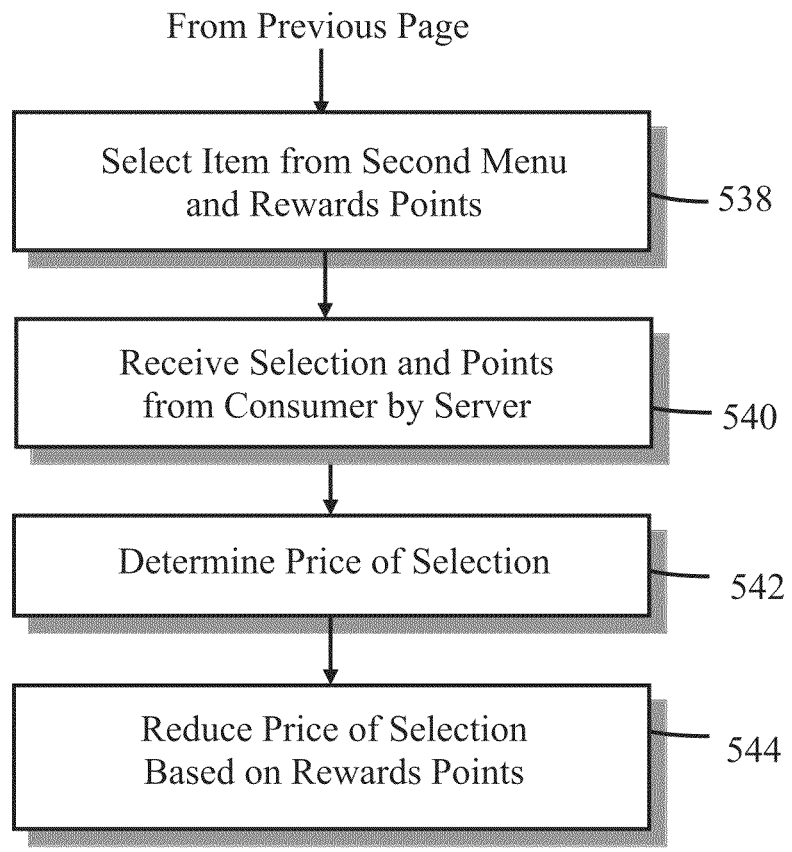

FIG. 5 is a flow diagram illustrating one embodiment for generating digitized, menus. Processor 300 within server 104 executes processor-executable instructions stored in memory 302 that causes the server 104 to perform the method. Server 104 is electronically coupled to a plurality of electronic ordering devices 102, such as the ones shown in FIG. 1 or in FIG. 2. It should be understood that in some embodiments, not all of the steps shown in FIG. 5 are performed, and that the order in which the steps are carried out may be different in other embodiments. It should be further understood that some minor method steps may have been omitted for purposes of simplifying the method description.

A typical application for the method described with reference to FIG. 5, below, comprises a restaurant setting where each restaurant customer is provided with his or her own electronic ordering device 102 by a restaurant employee. In other embodiments, electronic ordering devices are shared between or among two or more restaurant customers, for example by providing one electronic ordering device 102 to each table. However, it should be understood that the concepts discussed with respect to FIG. 5 are generally applicable to any situation where a set of choices are provided to consumers to purchase goods or services.

At block 500, in one embodiment, a customer is provided an electronic ordering device 102 that functions as an electronic menu for viewing and ordering goods and services from a provider of the goods or services, such as a restaurant, bar, spa, nightclub, etc. In another embodiment, the electronic ordering device 102 comprises a personal computing device owned by the customer, such as a smartphone, tablet computer, laptop computer, etc.

At block 502, the customer is asked to either log into an existing account stored by server 104 if the customer has created an account previously, or to create a new account if the customer has not created an account previously. Assuming that the customer does not have an existing account with server 104, the customer creates a new account with server 104 by providing information to electronic ordering device 102 and providing the information to server 104.

At block 502, server 104 receives the new account information sent by the customer at block 502.

At block 504, server 104 creates a new account and stores the account in memory 302. The account stores information of the customer's orders or purchases and information associated with the orders/purchases (such as the time and date that the purchases occurred) and other information, such as the customer's email address, address, telephone number, and/or rewards points associated with purchases.

At block 506, an initial choice set of items available for purchase is electronically provided to the customer by transmitting the initial choice set to electronic ordering device 102. In one embodiment, a choice set comprises a menu of food and/or beverages available for purchase. The initial choice set may be presented as a list of items, a graphical representation of the items, or combination of both, typically along with item prices, to customers. The initial choice set may be sent to a customer's electronic ordering device in response to creating an account for the customer, or it may be transmitted and stored on electronic ordering device 102 prior to a customer login or account creation request. In this case, a customer may be presented with the initial choice set and be given an option of whether to login to an existing account, create a new account, or place orders without the use of a customer account.

In one embodiment, the initial choice set comprises a "default" choice set comprising a list and/or display of available goods or services, and their respective prices, determined by one or more employees of the goods or service provider. For example, in a restaurant setting, a restaurant manager may provide information to processor 300 via user interface 306 describing each food and beverage item available for purchase by consumers in one of a variety of visual formats, for example, text only, graphical only, or a combination of text and graphical formats to describe each of the items available for purchase. The information may be provided as a digitized file whose contents may be displayed on any electronic ordering device 102.

In one embodiment, prior to sending the initial choice set to the customer, processor 300 first determines whether any of the goods or services offered in the initial choice set are unavailable for purchase. For example, in a restaurant setting, a restaurant employee may use user interface 306 to enter information into server 104 indicating unavailability of one or more dishes normally available to customers. In another embodiment, the employee may provide this information to server 104 using a device independent of server 104, such as an electronic ordering device 102, smartphone, tablet computer, laptop computer, desktop computer, etc, sent to server 104 via communication interface 304. This information may be stored in memory 302 and later retrieved by processor 300 prior to processor 300 sending the initial choice set to customers. If one or more items in the initial choice set are unavailable, processor 300 removes them from being included in the initial choice set.

At block 508, the customer places an order for goods or services using electronic ordering device 102. For example, in a restaurant setting, a customer may order an appetizer, a main course, a drink, and dessert. The order comprises an identification of the desired goods or services, and may additionally comprise an identification of the customer and/or the electronic ordering device 102 that is being used to place the order. The identification information may comprise a username of the customer, an IP address assigned to the electronic ordering device 102, a MAC address of the electronic ordering device 102, a code assigned during the login/account creation process, or any other way to identify the customer and/or the customer's electronic ordering device 102.

At block 510, the order is received by server 104 via communication interface 304 and provided to processor 300.

At block 512, processor 300 receives the order and forwards the order to a provider of the goods or services. For example, if the order comprises one or more food or beverage items, the order may be provided electronically, via communication interface 304, to a cook, waitperson, bartender, and/or other restaurant employee.

At block 514, processor 300 updates the customer's account to reflect the items that the customer has chosen for consumption or purchase. In another embodiment, processor 300 updates the account after receiving an indication that the customer has actually paid for the items in the order. The account may be updated to include an identification of those items or services, the number of goods or services purchased, a price that the consumer paid for the goods or services, a date or purchase, a time of purchase, etc.

At block 516, the customer concludes his or her business, pays for the goods or services received, and logs off of the system using electronic ordering device 102. In another embodiment, the customer is automatically logged off of the system after a predetermined time period has expired.

At some point in the future, at block 518, the customer returns to the original provider of goods or services where the account was created, or to a provider that is affiliated with the original provider and in communication with server 104. In another embodiment, the customer visits a goods or service provider different than the one where the customer created his or her account, also in communication with server 104.

At block 520, the customer is provided with an electronic ordering device 102, or the customer begins using his or her own electronic ordering device 102, such as a smartphone, laptop computer, tablet computer, etc.

At block 522, the customer logs into his or her existing account by entering identification information, typically a username and password, into his or her electronic ordering device 102. The identification information is transmitted to server 104 where it is received by communication interface 306 and provided to processor 300.

At block 524, processor 300 receives the identification information received from the customer and compares it to login information stored in memory 302. If a match is found, processor 300 the customer has successfully logged into his or her account.

In one embodiment, at block 526, processor 300 generates a digitized choice set (menu) for the customer based on information stored in the customer's account. In another embodiment, processor 300 generates a digitized choice set (menu) for the customer based on ordering or purchasing information received from other customers. In yet another embodiment, processor 104 generates a digitized choice set (menu) for the customer based on information stored in the customer's account and from ordering or purchasing information received from other customers. The digitized choice set may be generated using any of the techniques discussed above with reference to FIGS. 1 and 2.

For example, in one embodiment, processor 300 determines which item that the customer has ordered the most of in the past, based on purchasing/ordering information stored in the customer's account. For example, the customer's account may indicate that the customer has visited the provider's premises on 7 previous occasions, and has ordered food and beverages as shown in the table below, representing at least some of the information stored in the customer's account:

| | |
|---|---|
| Name: | John Smith |
| Username: | jsmith@yahoo.com |
| Password: | Pass1212 |
| Total number of Previous Visits | 7 |
| Rewards Points | 26,000 |

-continued

| Item | Quantity | Price Paid (each) |
|---|---|---|
| Appetizers | 2 | |
| Potato Skins | 0 | |
| Fried Calamari | 0 | |
| Onion Rings | 2 | $5.99 |
| Soups | 6 | |
| French Onion | 1 | 3.99 |
| Split Pea | 2 | 2.99 |
| Chicken | 3 | 4.99 |
| Salad | 0 | |
| House | 0 | |
| Chef | 0 | |
| Ceasar | 0 | |
| Main Course | 7 | |
| Prime Rib (rare) | 0 | |
| Prime Rib (med) | 4 | 29.99 |
| Prime Rib (well done) | 0 | |
| Lobster | 2 | 49.99 |
| Fish | 1 | 24.99 |
| Sides | 7 | |
| Green Beans | 1 | 4.99 |
| Corn | 2 | 3.99 |
| Rice | 0 | |
| Mashed Potatos | 4 | 3.99 |
| Beverages | 7 | |
| Milk | 2 | 1.99 |
| Beer | 5 | |
| Corona | 5 | 3.99 |
| Heinekin | 0 | |
| Budweiser | 0 | |
| Wine | 0 | |
| Merlot | 0 | |
| Caberet | 0 | |
| Chardonay | 0 | |
| Deserts | 4 | |
| Apple Pie | 2 | 6.95 |
| Chocolate Cake | 2 | 5.99 |
| Crème Brulee | 0 | |

It should be understood that the number and type of foods and beverages listed above is only one example of the total number of items that may be offered by a restaurant, and that, typically, many more food and beverage items will be available for purchase by customers. In addition, it should be understood that the format of the account, as shown above, may be different in other embodiments. For example, a customer account may only list the items that a customer has purchased, rather than list every item in the account that may or may not have been purchased.

Referring back to block 526, processor 300 evaluates the information in the customer's account, and determines that, in this example, the customer has ordered appetizers only 2 of 7 previous visits, but that onion rings were ordered both times. Thus, processor 300 may infer that the customer only rarely orders appetizers, but when he or she does, it is typically onion rings. As a result, processor 300 may generate a configurable choice set (menu) for the customer where only onion rings are displayed under an appetizer heading. In another embodiment, all of the available appetizers are included in the appetizer section of the configurable choice set, however onion rings is prominently displayed, for example, by listing it first in a list of appetizers, applying a prominent typeface to the title "Onion Rings", for example, in bold, italics, underlined, etc. In yet another embodiment, a plate of onion rings may be visually displayed near the top of the appetizer section of the customized choice set so that it occupies a relatively large portion of the appetizer portion of the configurable choice set. In yet still another embodiment, onion rings are displayed as an appetizer selection on a first display "page" of the choice set when the choice set comprises multiple display pages. Multiple display pages are commonly used when a restaurant carries many food and beverage items that would be difficult to include in a single display page on electronic ordering device 102.

In another embodiment, the configurable choice set generated by processor 300 prominently displays items that have been ordered more than a predetermined number of times in the past, or more than a predetermined percentage of purchases vs. the number of times that the customer has purchased items in the past. In yet still another embodiment, processor 300 determines which of the available items that have not been previously ordered by the customer, and assigning a discounted price to at least some of the available items that have not been previously ordered by the customer.

Processor 300 may also determine that soup was ordered 6 out of the 7 previous visits. Chicken soup was ordered the most (3 times), followed by split pea (2 times), then French onion (once). As such, the order in which soups are displayed in the customized choice set by processor 300 may be determined by the number of times each soup item was ordered in the past.

Processor 300 may also determine that the customer has never ordered a salad in all of his or her previous visits to the restaurant. In this case, processor 300 may choose to omit any items in the configurable choice set related to salads. In another embodiment, processor 300 may include a few of the most popular salads in the configurable choice set, based orders/purchases from other customers as determined by processor 300 querying those customers' account information. In yet another embodiment, only a heading labeled "Salads" may be displayed on a first page of the configurable choice set, hyperlinking a full set of salads offered by the restaurant on another page of the configurable choice set. This frees up space on the first page of the configurable choice set to highlight other offerings that the customer might be more interested in purchasing.

In the "Main Course" section, processor determines that the customer has ordered prime rib 4 of the past 7 visits, and that on each occasion, the customer ordered the prime rib "medium". In this case, if the customer orders a prime rib during the current visit, processor 300 may automatically modify the order to have the prime rib cooked "medium", and provide a message to the customer that this has occurred. Again, processor 300 may display prime rib prominently in the customized choice set in any of the ways discussed previously.

Processor 300 may also determine a beverage preference for the customer based on the information in the account. In the example above, the customer ordered milk 2 of the past 7 visits, and ordered beer 5 times. The particular beer that was ordered each time was "Corona" beer. No wine had ever been ordered. Thus, processor 300 may infer that the customer prefers Corona beer and does not typically drink wine of any sort. Therefore, when processor 300 generates the configurable choice set for the customer, it may prominently display Corona beer in a portion of the configurable choice set and include no wines. In another embodiment, wines may be included in the customized choice set, but not predominantly featured, such as on a second electronic "page" of the configurable choice set.

Regarding desserts, processor 300 determines from the account information that the customer has ordered desert 4 out of the 7 times that the customer has previously visited the restaurant. Processor may, therefore, include a dessert section in the configurable choice set. If no desserts had ever been ordered in the past, processor 300 might not include deserts in the choice set, may display dessert selections on a second electronic "page" of the customized choice set, or provide a hyperlink on the first page of the configurable digitized choice set that links to another page featuring desserts.

At block 526, after processor 300 has generated a configurable choice set for the customer, processor 300 transmits it to the customer via communication interface 304, where it is displayed to the customer by the customer's electronic ordering device 102. The customer may then view the customized choice set to decide which items to purchase.

At block 528, processor 300 determines a number of rewards points that have been accumulated by the customer as a result of purchases in one or more categories of goods or services. For example, a number of rewards points may have been awarded to the customer for previous food purchases. In this example, processor 300 determines that a total of 26,000 rewards points have been previously awarded to the customer, based on information stored in the customer's account.

At block 530, processor 300 transmits the rewards point information to the customer via communication interface 304, where it is displayed to the customer by the customer's electronic ordering device 102. In another embodiment, the rewards point information is incorporated into a new configurable digitized choice set by processor 300 and provided to the customer's electronic ordering device 102 for display to the customer.

At block 532, the customer's electronic display device 102 displays a second choice set to the customer, each item in the second choice set belonging to category of goods or services different than the first choice set. For example, if the first choice set comprises food and beverage items, the second choice set may comprise a main category of "Entertainment", and sub-categories of "Music", "Videos", or "Games", among others. The second choice set is typically provided by server 104 either pre-loaded onto electronic ordering device 102, or as a configurable choice set based on information in the customer's account, similar to what was described above with respect to previous food purchases. For example, the second configurable choice set may comprise a list of music with at least some of the music arranged in accordance with the number of times songs had been selected by the consumer in the past. In another embodiment, processor 300 may generate a configurable digitized choice set of music arranged in accordance with the number of times that each song had been selected by a plurality of consumers in the past. Electronic ordering device 102 is capable of storing a plurality of choice sets. The customer selects an item from the second choice set, along with an indication of a desire to apply rewards points towards the purchase of the item.

At block 534, the customer selects at least one item from the second digitized choice set and the customer's electronic ordering device sends a signal to server 104 indicative of the customer's selection.

At block 536, server 104 receives the signal from electronic ordering device 102, indicating the selected item and an instruction to reduce the cost of the item using at least some of the rewards points previously awarded to the customer. The indications are provided to processor 300.

At block 538, processor 300 determines a price of the item that was selected by the customer based on information previously provided to processor 300 and stored in memory 302.

At block 540, processor 300 reduces the cost of the item selected by the customer at block 534 by an amount based on the number of rewards points stored in the customer's account. The reduction may be based on an amount selected by the customer, or it may be performed automatically by processor 300, for example, using as many rewards points as necessary to drive the cost to zero, or until the number of rewards points is zero. Thus, the customer is able to build rewards points based on purchases from a first category of goods or services, and apply them to a second category of goods or services.

Figure 6:
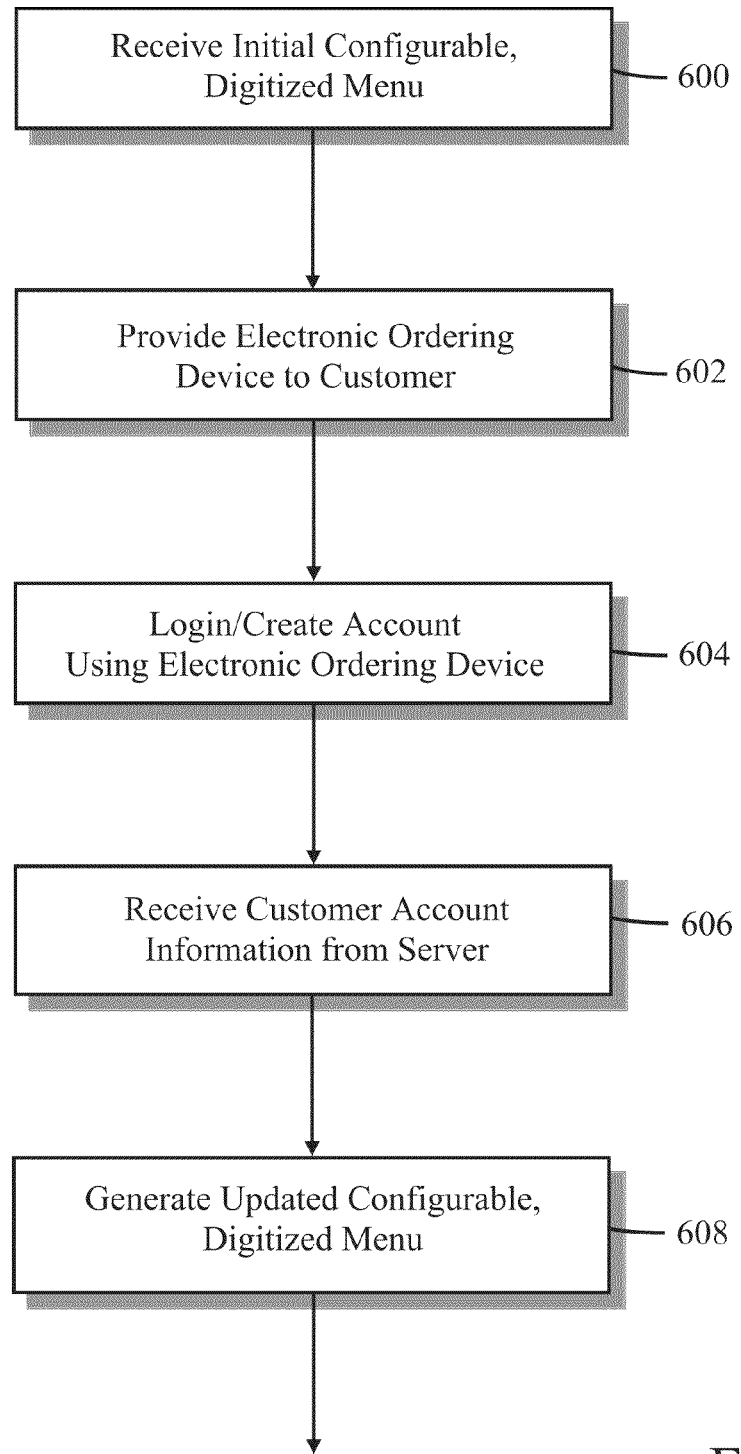
FIG. 6 is a flow diagram illustrating one embodiment for providing digitized menus to customers by one of the electronic ordering devices of FIG. 1 or FIG. 2.
Figure 6:
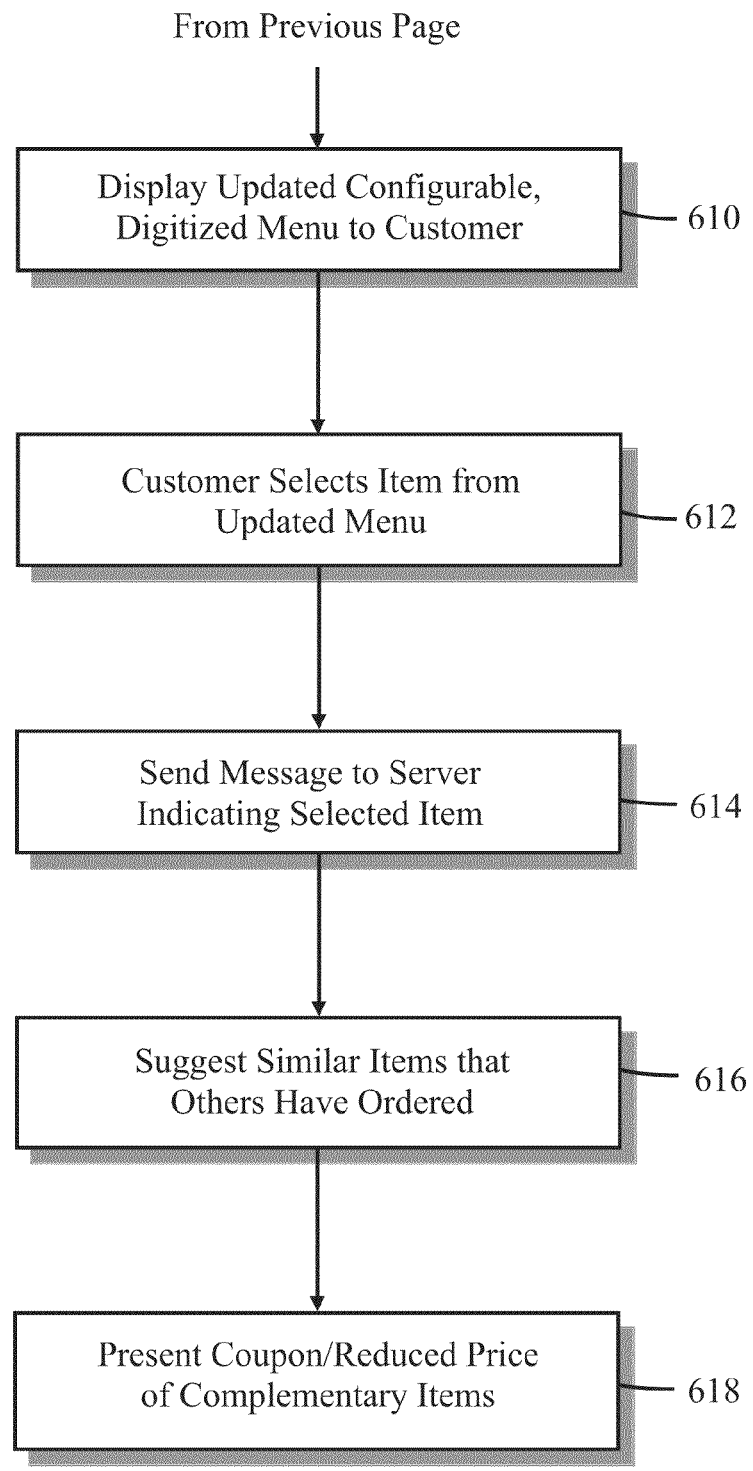

FIG. 6 is a flow diagram illustrating one embodiment for providing digitized menus to customers by electronic ordering device 102. In this embodiment, various functions carried out by server 104 are performed by electronic ordering device 102. Processor 400 executes processor-executable instructions stored in memory 402 that causes the electronic ordering device 102 to perform the method. electronic ordering device 102 is electronically coupled to server 104 as shown in FIG. 1 or in FIG. 2. It should be understood that in some embodiments, not all of the steps shown in FIG. 6 are performed, and that the order in which the steps are carried out may be different in other embodiments. It should be further understood that some minor method steps may have been omitted for purposes of simplifying the method description.

A typical application for the method described with reference to FIG. 6, below, comprises a restaurant setting where each restaurant customer is provided with his or her own electronic ordering device 102 by a restaurant employee. In other embodiments, electronic ordering devices are shared between or among two or more restaurant customers, for example by providing one electronic ordering device 102 to each table.

At block 600, electronic ordering device 102 receives an initial digitized choice set from server 104 via communication interface 404. The initial digitized choice set comprises a "default" selection of goods or services available for purchase by a consumer, typically arranged for display on user interface 406 as a "digitized menu", e.g., a visual rendering of text and/or photographs, including prices, of goods or services. The selection, arrangement, and pricing of items are typically provided by input from one or more employees of a provider of goods or services, such as a manager of a restaurant. Typically, server 104 provides the initial digitized choice set to all electronic ordering devices 102 in the provider's premises.

Other initial information may be provided to electronic ordering device 102 at block 600. For example, server 104 may provide a list of "complementary" offerings determined by processor 300 to be items that would complement one or more of the goods or services offered by the initial digitized choice set. Another example is information relating to the most popular items in the initial digitized choice set that have been ordered by other consumers over time.

At block 602, in one embodiment, as a customer is seated at a table or other dining area of a restaurant, electronic ordering device 102 is provided to the customer, allowing the customer to view the initial digitized choice set and to order items in the initial digitized choice set via user interface 406.

At block 604, the customer may be presented with an opportunity, via user interface 406, to either log into an existing account stored by server 104 or create a new account, as described above with respect to blocks 502-504 of FIG. 5.

At block 606, assuming that the consumer logged into a previously-created consumer account, electronic ordering device 102 may receive an updated configurable digitized choice set based on the consumer's prior purchasing history, based on the current and/or past purchasing history of other consumers, or a combination of both. Generation of the updated configurable digitized choice set is performed by server 104 as explained above with reference to block 526 of FIG. 5.

In another embodiment, at block 606, electronic ordering device 102 receives information that has been stored in the customer's account by server 104 in response to a successful login by the consumer. For example, the consumer's purchasing information (comprising an identification of past purchases by the customer and related information, such as a price paid, date and time of purchase, etc.), rewards points, and/or personal information, may be received by electronic ordering device 102 from the customer's account provided by server 104. Additionally, electronic ordering device 102 may receive purchasing information and related information gathered from other customers and stored by server 104. In this embodiment, processor 400 generates the updated configurable digitized choice set, rather than server 104, based on the consumer's information in the consumer's account, other consumer's purchasing information, or both, similar to the method used by server 104 to generate configurable digitized choice sets as explained above.

At block 608, in one embodiment, electronic ordering device 102 receives the updated configurable digitized choice set from server 104 via communication interface 404, and provides it to processor 400 where it is stored in memory 402.

At block 610, processor 400 causes the updated configurable digitized choice set to be displayed by user interface 406.

At block 612, the customer may select one or more items offered by the updated configurable digitized choice set using user interface 406. An indication of the customer's selection is provided to processor 400.

At block 614, processor 400 receives the indication of the selection by the customer and sends a message to server 104 indicative of the selection via communication interface 404.

At block 616, in response to receiving the selection, processor 400 may generate an indication to the consumer of items that other consumers have purchased, based on the customer's selection and based on the popularity of the purchases by other consumers. For example, if the customer has selected fried mozzarella sticks as an appetizer, processor 400 may determine, from data stored in memory 402, that the top three most popular fried appetizers ordered by other customers comprise fried zucchini, onion rings, and french fries. Processor 400 may provide this information to the consumer via user interface 406 immediately after the customer has entered his or her selection of fried mozzarella sticks, so that the consumer may change his or her mind based on the alternatives provided by processor 400.

At block 618, processor 400 may provide one or more coupons or indications of reduced prices of one or more complementary items associated with one or more items selected by the consumer at block 612. Processor 400 may determine which coupons to offer, or the reduced prices, by comparing the item(s) selected by the consumer at block 612 to a list of complementary offerings provided previously by server 104 and stored in memory 402. The coupons or price reductions may be displayed to the consumer by the use of one or more "pop-up" displays, by providing an updated version of the configurable digitized choice set, or by any other convenient method. In another embodiment, the coupons or reduced prices are provided by server 104.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method for providing digitized menus to customers by a computer server in communication with electronic ordering devices operated by customers, comprising:
   receiving, by the computer server, purchasing information from one or more customers sent by respective ones of the electronic ordering devices;
   receiving identification information by the computer server from a first one of the electronic ordering devices identifying a customer who has previous purchased goods or services, and providing the identification information to a processor within the computer server;
   identifying, by the processor, an account associated with the customer that is stored in a memory coupled to the processor, based on the identification information, the account for storing at least the purchasing information received from the customer in the past;
   generating a first digitized menu for display by at least one of the electronic ordering devices by the processor by:
      determining one or more items that have not been previously purchased by the customer as indicated by the account;
      assigning a discounted price to the one or more items; and
      replacing the original price of the one or more items with the discounted price;
   tracking a quantity goods or services purchased as indicated by the purchasing information, by the processor;
   identifying one or more of the goods or services that have been ordered in the greatest quantity;
   replacing a standard price of the goods or services in the first digitized menu that have been ordered in the greatest quantity with an adjusted price
   sending the first digitized menu to the first one of the electronic ordering devices via a communication interface coupled to the processor.

2. The method of claim 1, further comprising:
   receiving an order by the communication interface, from at least one of the electronic ordering devices, to purchase one or more items displayed in the first digitized menu.

3. The method of claim 1, further comprising:
   receiving identification information, by the communication interface, identifying a customer who has previous purchased goods or services using one of the electronic ordering devices, and providing the identification information to the processor;

identifying, by the processor, an account associated with the customer that is stored in a memory coupled to the processor, based on the identification information, the account for storing at least the purchasing information received from the customer in the past;

wherein generating the first digitized menu comprises:
  identifying one or more items in the account that has been purchased more than a predetermined number of times in the past; and
  arranging the one or more items for prominent display in the first digitized menu.

4. The method of claim 1, further comprising:

receiving identification information by the communication interface identifying a customer who has previous purchased goods or services using one of the electronic ordering devices, and providing the identification information to the processor;

identifying, by the processor, an account associated with the customer that is stored in a memory coupled to the processor, based on the identification information, the account for storing at least the purchasing information received from the customer in the past;

wherein generating the first digitized menu comprises:
  determining one or more items in the account that the customer has purchased in the past;
  arranging the one or more items for prominent display in the first digitized menu.

5. The method of claim 2, further comprising:

receiving identification information by the communication interface identifying a customer who has previous purchased goods or services using one of the electronic ordering devices, and providing the identification information to the processor;

identifying, by the processor, an account associated with the customer that is stored in a memory coupled to the processor, based on the identification information, the account for storing at least the purchasing information received from the customer in the past;

providing the order electronically to a provider of the at least one item; and modifying the account to reflect that the customer has ordered the item.

6. The method of claim 5, further comprising:

modifying the account to reflect the time or date that the item was ordered.

7. The method of claim 5, further comprising:

modifying the account to reflect an increase of reward points based on the order.

8. The method of claim 1, further comprising:

receiving identification information by the communication interface identifying a customer who has previous purchased goods or services using one of the electronic ordering devices, and providing the identification information to the processor;

identifying, by the processor, an account associated with the customer that is stored in a memory coupled to the processor, based on the identification information, the account for storing at least the purchasing information received from the customer in the past;

receiving an order to purchase an item in a second digitized menu displayed from one of the electronic ordering devices;

determining a price of the item; and reducing the price of the item based on a number of reward points in the account, the reward points earned by the customer based on previous purchases from the first digitized menu.

9. The method of claim 8, further comprising:

transmitting an indication of the number of rewards points in the account to one of the electronic ordering devices; and receiving a request to use at least some of the reward points in the account to offset the cost of the item from the second digitized menu;

wherein reducing the cost of the item comprises reducing the cost by an amount proportional to the number of reward points identified in the request to use at least some of the reward points.

10. The method of claim 1, further comprising:

receiving identification information from each of a plurality of customers via the communication interface;

accessing an account associated with at least some of the plurality of customers based on the identification information, the accounts each for providing a history of prior purchases by a respective customer;

wherein generating the first digitized menu comprises:
  identifying a quantity of goods or services that have been ordered in the past from information stored in the customers' accounts;
  arranging the first digitized menu based on the quantity of goods or services that have been ordered in the past.

11. The method of claim 1, wherein the purchasing information comprises an indication of a good or a service selected by one of the customers, the method further comprising:

identifying a complementary good or service to the good or service selected by the customer;

providing an indication of the complementary good or service to the electronic ordering device associated with the customer.

12. An apparatus for providing digitized menus to electronic ordering devices operated by customers, comprising:

a memory for storing processor-executable instructions and a plurality of accounts each for storing at least purchasing information of each of the customers received by respective ones of the electronic ordering devices, respectively;

a communication interface for receiving the purchasing information from the customers sent by respective ones of the electronic ordering devices, for transmitting a first digitized menu to at least one of the customers, and for receiving identification information identifying a customer who has previous purchased goods or services using one of the electronic ordering devices; and a processor, coupled to the memory and the communication interface, for executing the processor-executable instructions in the memory that cause the apparatus to:
  identify a first of the plurality of accounts stored in the memory based on the identification information, the account for storing the purchasing information received from one of the customers in the past;
  generate a first digitized menu for at least one of the customers based on the purchasing information by;
  determining an item that has not been previously purchased by the customer;
  assigning a discounted price to the item; and
  replacing the original price of the item with the discounted price;
  tracking the number of each item purchased, as indicated by the purchasing information, by the processor;

identifying one or more of the items that have been ordered in the greatest quantity;

replacing a standard price of the one or more items in the first digitized menu that have been ordered in the greatest quantity with an adjusted price; and sending the first digitized menu, including the discounted price and the adjusted price, to at least one of the electronic ordering devices for display on at least one of the electronic ordering devices.

13. The apparatus of claim 12, wherein the processor-executable instructions further comprise instructions for the apparatus to:

receive an order via the communication interface, from at least one of the electronic ordering devices, to purchase one or more items displayed in the first digitized menu.

14. The apparatus of claim 12, wherein the processor-executable instructions further comprise instructions for the apparatus to:

receive identification information via the communication interface identifying a customer who has previous purchased goods or services using one of the electronic ordering devices, and provide the identification information to the processor;

identify an account stored in the memory based on the identification information, the account for storing the purchasing information received from one of the customers in the past;

wherein the processor-executable instructions that cause the apparatus to generate the first digitized menu comprise instructions for the apparatus to:

identify an item in the account that has been purchased more than a predetermined number of times in the past; and arrange the item for prominent display in the first digitized menu.

15. The apparatus of claim 12, wherein the processor-executable instructions further comprise instructions for the apparatus to:

receive identification information via the communication interface identifying a customer who has previous purchased goods or services using one of the electronic ordering devices, and provide the identification information to the processor;

identify an account stored in the memory based on the identification information, the account for storing the purchasing information received from one of the customers in the past;

wherein the processor-executable instructions that cause the apparatus to generate the first digitized menu comprise instructions for the apparatus to:

determine one or more items in the account that the customer has purchased in the past;

arrange the one or more items for prominent display in the first digitized menu.

16. The apparatus of claim 13, wherein the processor-executable instructions further comprise instructions for the apparatus to:

receive identification information via the communication interface identifying a customer who has previous purchased goods or services using one of the electronic ordering devices, and provide the identification information to the processor;

identify an account stored in the memory based on the identification information, the account for storing the purchasing information received from one of the customers in the past;

provide the order electronically to a provider of the at least one item; and modify the account to reflect that the customer has ordered the item.

17. The apparatus of claim 16, wherein the processor-executable instructions further comprise instructions for the apparatus to:

modify the account to reflect the time or date that the item was ordered.

18. The apparatus of claim 16, wherein the processor-executable instructions further comprise instructions for the apparatus to:

modify the account to reflect an increase of reward points based on the order.

19. The apparatus of claim 12, wherein the processor-executable instructions further comprise instructions for the apparatus to:

receive identification information via the communication interface identifying a customer who has previous purchased goods or services using one of the electronic ordering devices, and provide the identification information to the processor;

identify an account stored in the memory based on the identification information, the account for storing the purchasing information received from the customer in the past;

receive an order to purchase an item in a second digitized menu displayed to the customer by the electronic ordering device;

determine a price of the item; and reduce the price of the item based on a number of reward points in the account, the reward points earned by the customer based on previous purchases from the first digitized menu.

20. The apparatus of claim 19, wherein the processor-executable instructions further comprise instructions for the apparatus to:

transmit an indication of the number of reward points in the account to an electronic ordering device associated with the customer; and receive a request from the electronic ordering device to use at least some of the reward points in the account to offset the cost of the item from the second digitized menu;

wherein reducing the cost of the item comprises reducing the cost by an amount proportional to the number of reward points identified in the request to use at least some of the reward points.

21. The apparatus of claim 12, wherein the processor-executable instructions further comprise instructions for the apparatus to:

receive identification information from a plurality of customers via a plurality of electronic ordering devices provided to the customers;

access an account associated with at least some of the plurality of customers, the accounts for providing a history of prior purchases by the customers;

wherein the processor-executable instructions that cause the apparatus to generate the first digitized choice comprise instructions for the apparatus to:

identify one or more goods or services that have been ordered in the past from information stored in the customers' accounts;

arrange the one or more goods or services or prominent display in the first digitized menu.

22. The apparatus of claim 12, wherein the purchasing information comprises an indication of a good or a service selected by one of the customers, wherein the processor-executable instructions further comprise instructions for the apparatus to:
- identify a complementary good or service to the good or service selected by the customer;
- provide an indication of the complementary good or service to the electronic ordering device associated with the customer.

\* \* \* \* \*